(12) United States Patent
Bolle

(10) Patent No.: US 6,655,852 B2
(45) Date of Patent: Dec. 2, 2003

(54) PRECISION TWO DIMENSIONAL OPTICAL FIBER ARRAY

(75) Inventor: Cristian A Bolle, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/915,964

(22) Filed: Jul. 26, 2001

(65) Prior Publication Data

US 2003/0021547 A1 Jan. 30, 2003

(51) Int. Cl.$^7$ ................................................ G02B 6/36
(52) U.S. Cl. ........................................................ 385/82
(58) Field of Search ............................ 385/78, 80, 81, 385/82, 83, 84, 85, 100, 101

(56) References Cited

U.S. PATENT DOCUMENTS

| | | | | |
|---|---|---|---|---|
| 3,914,015 A | * | 10/1975 | Mc Cartney | 385/54 |
| 4,109,994 A | * | 8/1978 | Chown | 385/82 |
| 4,229,068 A | * | 10/1980 | Hodge et al. | 385/22 |
| 4,300,815 A | * | 11/1981 | Malsot et al. | 385/81 |
| 5,675,680 A | * | 10/1997 | Ames et al. | 385/54 |
| 5,787,217 A | * | 7/1998 | Traut et al. | 385/106 |
| 6,349,160 B2 | * | 2/2002 | Tsien et al. | 385/35 |
| 6,424,769 B1 | * | 7/2002 | Olsson et al. | 385/102 |

OTHER PUBLICATIONS

Masayasu Yamaguchi et al., "High–Density Digital Free–Space Photonic–Switching Fabrics Using Exciton Absorption Reflection–Switch (EARS) Arrays and Microbeam Optical Interconnections", *IEEE Journal of Selected Topics in Quantum Electronics*, vol. 2, No. 1, Apr. 1996, pp. 47–54.

* cited by examiner

*Primary Examiner*—Lynn Feild
*Assistant Examiner*—Thanh-Tam Le
(74) *Attorney, Agent, or Firm*—Eugene J. Rosenthal

(57) ABSTRACT

A precise fiber array may be formed by employing an array of pins into ones of the resulting interstices of which is inserted and bonded, e.g., glued, a fiber end. Such an array may be made by employing a chuck, at least initially, to tightly hold as an array a group of pins, e.g., metal, ceramic, or plastic pins. Thereafter, a fiber end is inserted and bonded into ones of the interstices formed by the resulting gaps, i.e., the interstices, between the pins. The pins may also be bonded to each other. If so, once the pins are bonded together, the chuck may be removed. The terminating end of the fibers may be polished. Alternatively, previously cleaved terminating fiber ends may be employed, with the various terminating ends being coordinated, e.g., by an optical flat or other surface which is placed at, or adjacent to, the fiber terminating end of the pin array.

36 Claims, 3 Drawing Sheets

PRECISION TWO DIMENSIONAL OPTICAL FIBER ARRAY

TECHNICAL FIELD

This invention relates to the art of optical fiber arrays, and to methods for making same.

BACKGROUND OF THE INVENTION

It is often desirable to have very precise two-dimensional arrays of optical fibers e.g., for use with an all optical switch. In particular, for single-mode optical fiber as is typically used in optical communications networks, such fiber often having a core with a diameter of 6–9 microns and a cladding with a diameter of 125 microns, positional tolerances of less than 2 microns from true position and angular tolerances of less than 0.5 degrees are required for each fiber in the fiber arrays. In the prior art, fiber arrays were made by fabricating a plate into which holes are made, and an individual fiber end is inserted into each hole. The plates may be made from a variety of materials, with silicon or a ceramic being preferred when a very precise array is required. The holes may be made by etching or drilling into the plate, using either mechanical techniques or through the use of a laser. The individual fiber ends are locked into place, e.g., with a small amount of glue. After that, the remaining fiber stubs protruding from the front of the plate are cut off, and the resulting ends are polished flat.

Unfortunately, the plates that can be made are usually rather thin, due to limitations in the technology for the plates and their holes. Such a thin plate is able to provide only a rather short guide and hold for each fiber so that, disadvantageously, the mechanical properties of the resulting fiber array is less than desirable. Further disadvantageously, the plates have to be custom-made, which usually requires special tools and expertise. Assembly of the array also requires special skills and precise fixtures. The polishing step at the end of the assembly is not trivial, and it is very time-consuming.

Also, in the prior art, fibers have been grouped in bundles for various purposes, e.g., by tying the fibers together or by grouping the fibers inside of a sleeve, e.g., in a fiber cable. However, such groupings do not provide precise alignment and spacing of the fibers at the exit from the bundle. Also, the maximum spacing is limited to the diameter of the individual fibers.

In "High-Density Digital Free-Space Photonic-Switching Fabrics Using Exciton Absorption Reflection-Switch (EARS) Arrays and Microbeam Optical Interconnections" by Masayasu Yamaguchi, Tsuyoshi Yamamoto, Katsuhiko Hirabayashi, Shinji Matsuo, and Kunio Kobayu published in the IEEE Journal of Selected Topics in Quantum Electronics, Vol. 2, No. 1, April 1996, describes a 2-D fiber array consisting of stacked microglass ferrules arranged with a square packing using zirconia plates and brass frames. Disadvantageously, the fiber positional reproducibility achievable, i.e., the average displacement of the fiber centers from the desired grid points, is ±3.1 µm, and the fiber misorientation is 4 degrees on average. Such a fiber array does not meet the stringent requirements of current MEMS-based optical switches, such as the Lambda Router from Lucent Technologies, which requires that the fiber positional reproducibility be no more than ±2 µm and that the angular misorientation be no greater than 0.5 degrees on average.

There is a children's project in the prior art that involves hollow cylindrical beads which may be hexagonally arranged using a form that has protruding pins, one pin for each bead. The beads are held together by first ironing the side of the beads opposite to the form, then removing the beads from the form and ironing the side of the beads that had been adjacent to the form. Such beads are not precisely spaced, or aligned and they become deformed when they are ironed. This children's project is unrelated to optical fiber in any way.

SUMMARY OF THE INVENTION

Previously we recognized that a precise fiber array may be formed by employing an array of ferrules arranged with a hexagonal packing structure into ones of which is inserted and bonded, e.g., glued, a fiber end, and that doing so would require that the target array, e.g., the array of micro mirrors on a corresponding MEMS device such as is employed in the Lucent Lambda Router, or other detectors or source arrays, will have to be configured hexagonally so as to correspond to the hexagonal fiber array. Such an array may be made by employing a chuck, at least initially, to tightly hold as an array a group of precision ferrules. Thereafter, a fiber end is inserted and bonded into ones of the ferrules. The ferrules may also be bonded to each other. If so, once the ferrules are bonded together, the chuck may be removed. Advantageously, such arrays of optical fibers may be manufactured to very high tolerances so as to be useful in positioning fiber arrays for all-optical switching. The terminating end of the fibers may be polished or previously cleaved terminating fiber ends may be employed, with the various terminating ends being coordinated.

We have now further recognized that a precise fiber array may be formed without requiring the use of ferrules. More specifically, in accordance with the principles of the invention, a precise fiber array may be formed by employing an array of pins into ones of the resulting interstices of which is inserted and bonded, e.g., glued, a fiber end. Such an array may be made by employing a chuck, at least initially, to tightly hold as an array a group of pins, e.g., metal, ceramic, or plastic pins. Thereafter, a fiber end is inserted and bonded into ones of the interstices formed by the resulting gaps, i.e., the interstices, between the pins. The pins may be arranged to have a hexagonal packing structure.

The pins may also be bonded to each other. If so, once the pins are bonded together, the chuck may be removed. Advantageously, such arrays of optical fibers may be manufactured to very high tolerances so as to be useful in positioning fiber arrays for all-optical switching. More specifically, the fiber positional reproducibility, i.e., the average displacement of the fiber centers from the desired grid points is no more than ±2 µm and the angular misorientation is no greater than 0.5 degrees on average.

The terminating end of the fibers may be polished. Alternatively, previously cleaved terminating fiber ends may be employed, with the various terminating ends being coordinated, e.g., by an optical flat or other surface which is placed at, or adjacent to, the fiber terminating end of the pin array.

The pins employed may be conventional off-the-shelf pins which have low cost. Such pins are manufactured to very tight tolerances. More specifically, it is well established that such pins can be manufactured substantially uniformly, so as to have only a very small error in their diameter from the prescribed nominal pin diameter and are longer than the thickness of the prior art face plates so that mechanical support superior to that achieved using such prior art faceplate arrangements is achieved. Advantageously, the precision fiber arrays of the invention scale well so that precision fiber arrays with a large number of fibers and which meet the strict Lambda Router quality requirements can be inexpensively manufactured.

In accordance with an aspect of the invention, the chuck may be fabricated so that it holds the pins in a straight orientation or so that it holds the pins in an angled orientation. An angled orientation provides the advantage of reducing back reflection in the fiber. It is often desirable to ensure that the fiber terminating faces of all of the pins are substantially coplanar.

In accordance with an aspect of the invention, instead of using solid pins the pins may have holes drilled therethrough, e.g., the pins may be ferrules. Fiber ends may be inserted within the holes in the ferrules as well as in the interstices between the ferrules. Advantageously, denser arrays may be formed.

DETAILED DESCRIPTION

Figure 1:
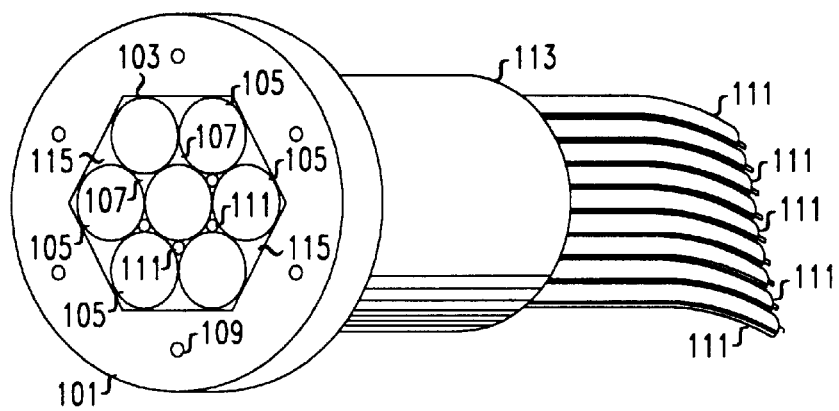
FIG. 1 shows a side view of a precise fiber array formed by employing a chuck to tightly hold as a array a group of precision pins into at least some of the resulting interstices is inserted and bonded a fiber, in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

In the description, identically numbered components within different ones of the FIGS. refer to the same components.

U.S. patent application Ser. No. (case Basavanhally-Bolle-Kolodner-Ruel-Weld 27-10-8-7-40) is incorporated by reference as if set forth fully herein.

FIG. 1 shows a side view of a precise fiber array formed by employing a chuck to tightly hold as a array a group of precision pins into at least some of the resulting interstices is inserted and bonded a fiber, in accordance with the principles of the invention. Note that by a "chuck" it is meant herein to include any device capable of holding the pins in a desired array shape with a requisite spacing and packing at least at one point through the course of manufacture or completion of the array. Typically, for stability purposes, the pins are arranged with a hexagonal packing. When the pins are packed hexagonally the resulting interstices may be seen as forming two overlapping hexagonal arrays. However, since only a subset of the interstices need have fiber ends therein, it is possible to select only those interstices that form an array of interest.

More specifically, shown in FIG. 1 is chuck 101 which has a hexagonal hole 103 into which are inserted precision pins 105. Within respective ones of the resulting interstices 107 are inserted respective ends of ones of optical fibers 111. Within the face of chuck 101 can be seen optional mounting holes 109.

Chuck 101 holds pins 105 in place initially at least through the use of pressure. One method of assembling pins 105 within chuck 101 is to insert most of pins 105 within hole 103 of chuck 101. Chuck 101 is then heated, so that it expands sufficiently to enable insertion of the rest of pins 105 within hole 103. The any remaining pins 105 are then inserted within hole 103, and chuck 101 is then allowed to cool down. Upon cooling, chuck 101 contracts sufficiently to exert the necessary pressure on pins 105 within hole 103. Note that in heating chuck 101 typically pins 105 are also heated and expand in size. However, pins 105 are made from a material which expands less for the same change in temperature than does chuck 101, which is typically metal., plastic, or ceramic. Note that the pins may be from the same material category as chuck so long as the particulars of the pins are different to provide a smaller expansion. Thus, it becomes possible to insert any remaining pins 105. The tolerances of the outside dimensions of the pins employed are very high, e.g., they may be on the order of one half of a micrometer, and the differences in size between hole 103 and the pin array is very small, e.g., less than two microns, yet the difference in size resulting from thermal expansion is sufficient to insert any remaining pins.

After the ends of fibers 111 are inserted into interstices 107, glue may be employed to both hold the fibers within the interstices as well as glue the pins to each other and to chuck 101. Furthermore, coupled to chuck 101 is optional strain relief sleeve 113, through which the optical fibers 111 pass. Fibers 111 are optionally encased in glue within strain relief sleeve 113, which couples the fibers to each other and to strain relief sleeve 113. Such glue provides strain relief for fibers 111. Note that fibers 111 may be encased in glue and after the glue dries any mold used for shaping the glue may be removed.

Optical fibers 111 are terminated at the end of interstices 107 that are furthest from strain relief sleeve 113. Optical fibers 111 are each typically arranged to terminate substantially coplanar with the face of chuck 101. This may be achieved by polishing the fibers until they are coplanar with the pins, i.e., polishing the fiber down to the pins. Typically also, the ends of the pins are polished as well. In practice, all the fibers are typically polished as part of a single manufacturing step, so they are all polished to be coplanar with each other and the face of chuck 101.

In other embodiments of the invention, the polishing may be performed to achieve a shape other than flat for the face of the fiber array.

Alternatively, each of optical fibers 111 are arranged to terminate substantially coplanar with the face of chuck 101 by inserting cleaved fiber ends into the interstices and employing an optical flat at the fiber terminating end to line up the fiber ends and the pin ends.

Unlike when polishing is used, when cleaved fibers are used, it is necessary to protect the cleaved fiber ends from the mass of glue that is used to couple the fibers to each other and to optional strain relief sleeve 113. To this end, when the fibers are lined up by the optical flat, only a very small drop of glue is used to hold the fibers in place, the glue being placed somewhat away from the fiber's cleaved end when the fiber is inserted into the interstice. Once all the fibers are initially glued in position, a soluble protective layer is applied from the front to protect the fibers. Thereafter, the glue is applied from the back to couple the fibers to each other and to optional strain relief sleeve 113. After the glue dries, the soluble protective layer is dissolved using an appropriate solvent.

Use of cleaved fibers permits arrangements where the fiber sticks out somewhat beyond the face of chuck 101. Thus, if a shape other than flat is desired, the inverse of the desired shape may be used in lieu of the optical flat. Furthermore, whether polishing or a surface-lining-up technique is employed, it is possible to arrange the front surface profile of the pins, e.g., by using a removable three-dimensional profile, so that when the pins are held by chuck 101 they maintain the shape of the profile. The fiber ends may also be cleaved at an angle so that the resulting fiber face is not substantially perpendicular to the direction of travel of light as it exits the fiber.

Reinforcing sleeve 113 may be a separate component coupled to chuck 101, e.g., by gluing or other mechanical coupling, or reinforcing sleeve 113 may be integrated with chuck 101 to form a single unit. The advantage of reinforcing sleeve 113 being separate from chuck 101 is that it enables chuck 101 to have a thickness on the order of the length of pins 105, which enables easy access to the back of pins 105 to facilitate insertion of the ends of fibers 111 into interstices 107 during manufacturing.

Optional mounting holes 109 may be used for various purposes such as 1) to mount the fiber array to a housing, 2) to hold the fiber array during polishing, or 3) to attach reinforcing sleeve 113 to chuck 101.

Advantageously, such arrays of optical fibers may be manufactured to very high tolerances so as to be useful in positioning fiber arrays for all-optical switching. More specifically, the fiber positional reproducibility, i.e., the average displacement of the fiber centers from the desired grid points is no more than ±2 $\mu$m and the angular misorientation is no greater than 0.5 degrees on average.

Note that the target array, e.g., the array of micro mirrors on a corresponding MEMS device such as is employed in the Lucent Lambda Router, or other detectors or source arrays, will have to be configured so as to correspond to the fiber array.

Note also that other packing arrangements of the pins may be employed, e.g., square packing. Furthermore, pins with varying diameters may be employed. Thus, the inventive technique is sufficiently flexible to produce a wide variety of different arrays.

Note that interstices 115 between the pins and the walls are typically of a different size and shape than interstices 107. Interstices 115 may be used for other purposes, e.g., alignment. Alternatively, the walls of chuck 101 may be shaped so that the size of interstices 115 can accommodate additional fibers 111.

Figure 2:
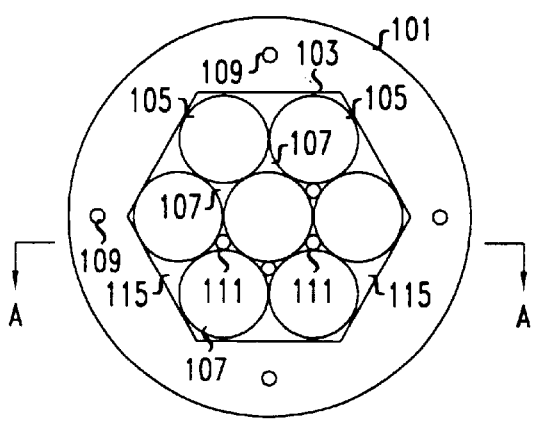
FIG. 2 shows a front view of the precise fiber array of FIG. 1.

FIG. 2 shows a front view of the precise fiber array of FIG. 1. Due to the nature of the view, only an end of each of optical fibers 111 can be seen in FIG. 2. The face of the precise fiber array in FIG. 2 is flat, either through the use of polishing or an optical flat.

Figure 3:
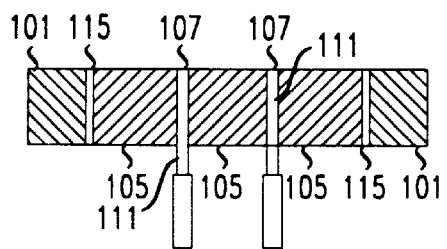
FIG. 3 shows a cross-sectional view of the precise fiber array along axis AA of FIG. 2.

FIG. 3 shows a cross-sectional view of the precise fiber array along axis AA of FIG. 2. The ends of fibers 111 can be seen in FIG. 3 within interstices 107. Note that FIG. 3 shows three (3) of pins 105 and two (2) of fibers 111 in the resulting interstices.

Pins 105 may have a rounded edge or a short taper at one or both of the edges. Doing so widens the end of the interstice into which a fiber end is inserted. Having the rounded edge or taper at both ends alleviates the need to ensure the pin is inserted into the chuck in a particular direction to get the advantage of the taper.

Figure 4:
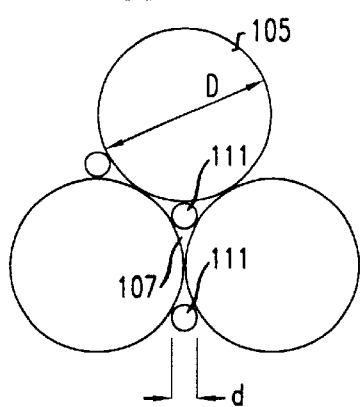
FIG. 4 shows a relationship between the diameter of pins and fibers employed in the embodiment of the invention when both are round in shape and hexagonal packing is employed.

FIG. 4 shows a relationship between the diameter of pins 105 and fibers 111 when both are round in shape and hexagonal packing of pins 105 is employed. When the diameter of the pin is D and the diameter of the fiber is d, $d=D(\tfrac{2}{3}\sqrt{3}-1)$ which translates to approximately $d=D*0.1547$. Thus, for a typical fiber diameter of 125 $\mu$m requires that the pins have a diameter of approximately 808 $\mu$m. Note that to enable insertion of the fiber the diameter of the pin should be slightly larger, so as to create a slightly larger interstice. However, because of the translation of pin diameter to interstice diameter, the tolerances are still quite precise, i.e., a change in the diameter of the pin of 1 $\mu$m results in a change of the interstice diameter of only 0.1547 $\mu$m.

Figure 5:
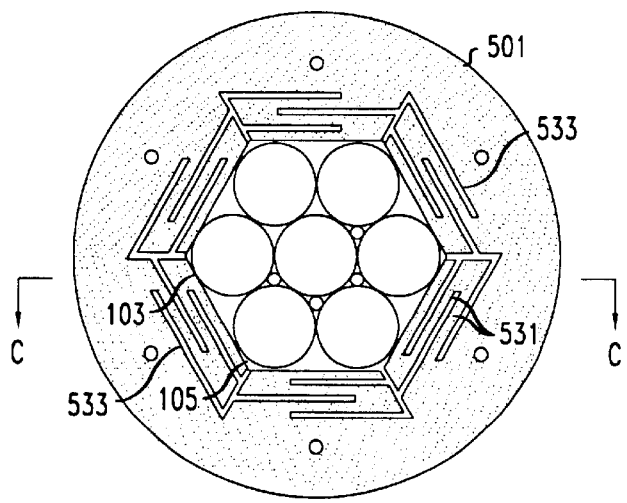
FIG. 5 shows a front view of another embodiment of a precise fiber array formed by employing a chuck to tightly hold as an array a group of precision pins into at least some of the resulting interstices of which is inserted and bonded a fiber end, in accordance with the principles of the invention.

FIG. 5 shows a front view of another embodiment of a precise fiber array formed by employing a chuck to tightly hold as an array a group of precision pins 105 into at least some of the resulting interstices of which is inserted and bonded a fiber end of one of fibers 111, in accordance with the principles of the invention. The precise fiber array of FIG. 5 is identical to that shown in FIG. 2 except for the substitution of chuck 501 for chuck 101. Chuck 501 is fabricated to incorporate within it flexible beams 531 which act as springs. Hole 103 is cut to be just slightly smaller than the array of pins 105. Inserting the pins forces the springs to displace slightly, causing expansion of hole 103. As a result, the springs exert a constant restorative force against the pins holding them securely together with the desired precise spacing and alignment.

In some embodiments of the invention, the restorative force is on the order of 20 pounds. However, the restorative force necessary will need to be determined by the implementer given the specific design and materials used. Those of ordinary skill in the art will be able to readily determine the appropriate amount of force.

The flexible beams may be made by employing electric discharge milling (EDM) to cut slots 533 through chuck 501.

Optionally, to improve performance of the array, a thin sheet of elastic material, e.g., a plastic or polyester such as Mylar®, which is a trademark of DuPont, or a polyimide, may be inserted between the walls making up hole 103 and the ones of pins 105 that abut the walls of hole 103. Doing so helps to even out any irregularities in the walls making up hole 103.

Figure 6:
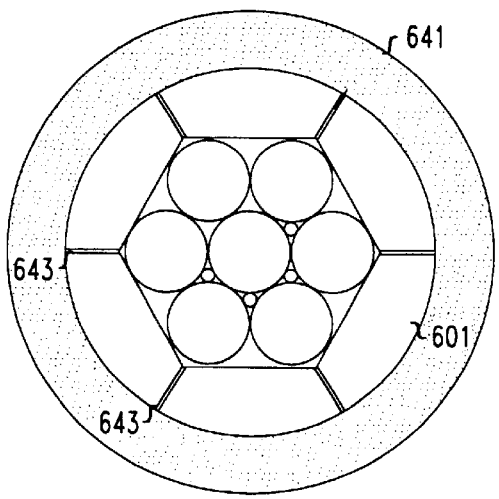
FIG. 6 shows a front view of another embodiment of a precise fiber array formed by employing a chuck to tightly hold as an array a group of precision pins into at least some of the resulting interstices of which is inserted and bonded a fiber end, in accordance with the principles of the invention.

FIG. 6 shows a front view of another embodiment of a precise fiber array formed by employing a chuck to tightly hold as an array a group of precision pins 105 into at least some of the resulting interstices of which is inserted and bonded a fiber end of one of fibers 111, in accordance with the principles of the invention. The precise fiber array of FIG. 6 is identical to that shown in FIG. 2 except for the substitution of chuck 601 for chuck 101 and the addition of clamping ring 641 around chuck 601. Slots 643 are cut in chuck 601. However, slots 643 do not go all the way through, so that at the bottom of chuck 601 a complete ring of metal remains. Thus chuck 601 appears to be six flexible walls extending upward from a solid ring. Each of the flexible walls acts as a spring. Hole 103 is cut to be the same size as the array of pins 105. Clamping ring 641 is employed to apply pressure on the flexible walls of chuck 601 so as to keep the pin array in place. Again, optionally, a thin sheet of elastic material may be inserted between the walls making up hole 103 and the ones of pins 105 that abut the walls of hole 103.

Figure 7:
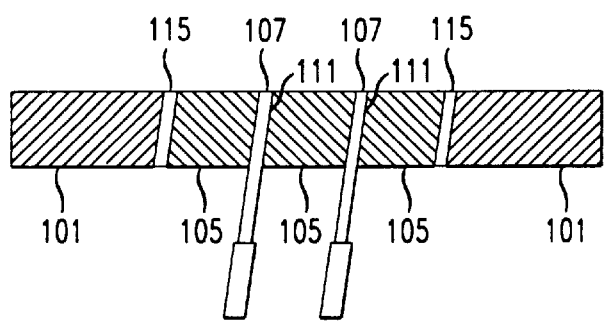
FIG. 7 shows a cross-sectional view along axis C—C of FIG. 5 of another embodiment of the invention.

FIG. 7 shows a cross-sectional view along axis C—C of FIG. 5 of another embodiment of the invention in which the walls of hole 103 are cut at an angle, in accordance with an aspect of the invention. Since the walls are cut at an angle, all of pins 105, when placed within chuck 501, are at the same angle, as are fibers 111 when they are inserted within interstices 107. Once the face of the array is polished, the faces of the ends of fibers 111 are each oriented with the same angle. Advantageously, back reflection, i.e., the reflection of light at the end of the fiber back through the fiber due to a difference of the reflective index between the fiber and the material at its end, in each of fibers 111 is reduced. Yet again, optionally, to improve performance of the array, a thin sheet of elastic material may be inserted between the walls making up hole 103 and the ones of pins 105 that abut the walls of hole 103.

Figure 8:
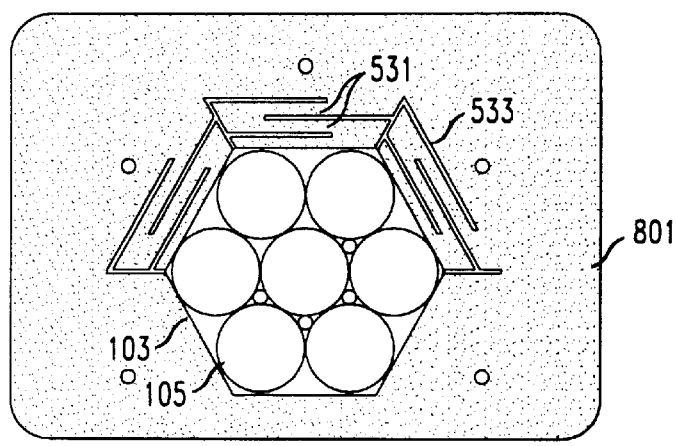
FIG. 8 shows a front view of another embodiment of a precise fiber array formed by employing a chuck to tightly hold as an array a group of precision pins into at least some of the resulting interstices of which is inserted and bonded a fiber end, in accordance with the principles of the invention.

FIG. 8 shows a front view of another embodiment of a precise fiber array formed by employing a chuck to tightly hold as an array a group of precision pins 105 into at least some of the resulting interstices of which is inserted and bonded a fiber end of one of fibers 111, in accordance with the principles of the invention. The precise fiber array of FIG. 8 is identical to that shown in FIG. 5 except for the substitution of chuck 801 for chuck 501. Chuck 801 is of the same basic design as chuck 501, in that it is fabricated to incorporate within it flexible beams 531 which act as springs. However, chuck 801 is asymmetrical in that the springs are formed only on one side. Furthermore, the wall thickness of chuck 801 is not even all around.

Hole 103 is cut to be just slightly smaller than the array of pins 105. Inserting the pins forces the springs to displace slightly, causing expansion of hole 103. As a result, the springs exert a constant restorative force against the pins holding them securely together. The reduced number of springs, as compared with chuck 501, is still quite sufficient to adequately and precisely hold pins 105 in place. The advantage of using such an asymmetrical design is that one side can be made narrower than the other, so that it can be cleared by an optical beam that would otherwise have been intercepted by the additional chuck material. As with the embodiment of FIG. 5 optionally, a thin sheet of elastic material may be inserted between the walls making up hole 103 and the ones of pins 105 that abut the walls of hole 103.

Figure 9:
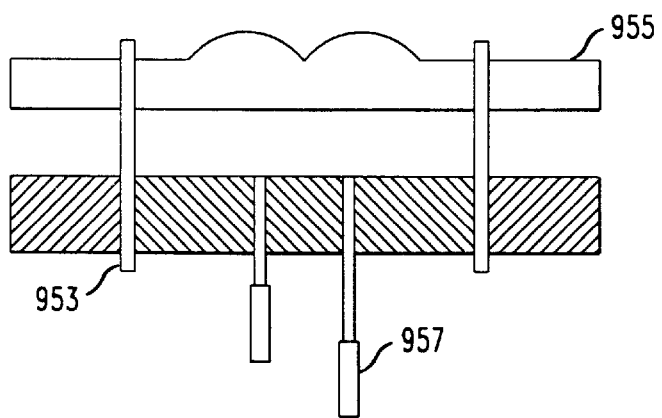
FIG. 9 shows alignment members extending to mate with alignment holes in precise fiber array, in accordance with an aspect of the invention.

In lieu of containing optical fibers, some of interstices 107 could be dedicated to containing alignment members, which may be pins, fibers, wires or the like, which are used to align a further component or array, e.g., a lens array, an array of detectors, an array of micro machines, or the like, with the fiber array. To this end, each alignment member must protrude from the face of the array so that it may be extended into a corresponding hole in the further array. A cross section of such an alignment arrangement is shown in FIG. 9, which shows alignment members 953 extending to mate with alignment holes 955 of further array 957.

Similarly, one or more of interstices 107 need not contain any fibers. Such interstices may be employed to receive some type of alignment member to align a further component or array.

Interstices 115 may similarly be employed for alignment purposes.

In accordance with an aspect of the invention, instead of using solid pins, the pins may have one or more holes drilled therethrough, e.g., the pins may be ferrules. Fiber ends may be inserted within the holes in the ferrules as well as in the interstices between the ferrules. Advantageously, denser arrays may be formed. Alternatively, the holes within the ferrules may be employed for alignment, e.g., having an alignment member bonded therein or to be adapted to receive an alignment member.

Furthermore, although the pins have been shown to be round, they need not be round, but may be any shape desired by the implementer to achieve a prescribed array.

Although the chuck has been shown to be round in most of the embodiments, this need not be so. Any other shape desired may be used for the chuck. Furthermore, although the interior hole of the chuck has been shown to be hexagonal, those of ordinary skill in the art will readily appreciate that any other shape desired may be employed as well, so long as the desired packing of the pins is maintained.

Those of ordinary skill in the art will readily appreciate that spring designs other than those explicitly depicted herein may be employed by applying the principles of the invention.

Note that although chuck has been shown remaining as part of the final array, even when the pins are bonded to each other through the use of glue. However, if the pins are bonded together, thereafter the chuck may be removed.

What is claimed is:

1. An apparatus, comprising
   a plurality of pins arranged in an array so as to form an array of interstices, each of said interstices being a space between at least two of said pins;
   a chuck holding said pins in an array with hexagonal packing, said chuck including at least one flexible portion acting as a spring to exert a restorative force against said pins thereby holding them securely together with a desired precise spacing and alignment;
   a layer of a non-rigid, non-glue, elastic material interposed between said chuck and said pins that abut said chuck, said material being non-rigid with respect to said chuck and said pins; and
   a plurality of optical fibers each having an end bonded within a one of said interstices.

2. The invention as defined in claim 1 wherein said chuck is fabricated to include at least one flexible member.

3. The invention as defined in claim 1 wherein said interstices have an average deviation from the correct positions of less than 3 $\mu$m.

4. The invention as defined in claim 1 wherein said interstices have a collective displacement of less than 3 $\mu$m.

5. The invention as defined in claim 1 wherein said interstices have an average angular misorientation of 3.9 or less degrees.

6. The invention as defined in claim 1 wherein said fibers are bonded within said interstices using glue.

7. The invention as defined in claim 1 wherein said pins are arranged to be substantially perpendicular to a face of said chuck.

8. The invention as defined in claim 1 wherein said pins are arranged at an angle to a face of said chuck.

9. The invention as defined in claim 1 wherein said chuck has a hexagonal opening within which said pins are held in said array with hexagonal packing.

10. The invention as defined in claim 1 wherein at least one of said pins is tapered at at least one end.

11. The invention as defined in claim 1 wherein each of a subset of at least two of said fibers has a terminating end that is substantially flush with one end of the pins forming the ones of said interstices into which each of said at least two fibers of said subset is inserted, and said terminating end of all fibers of said subset being substantially coplanar.

12. The invention as defined in claim 11 wherein at least one of said fibers has a terminating end that is not substantially coplanar with said terminating ends of said subset of said fibers.

13. The invention as defined in claim 1 wherein said pins are at least two millimeters long.

14. The invention as defined in claim 1 wherein said pins are substantially formed from a material from the set of materials consisting of metal, plastic, and ceramic.

15. The invention as defined in claim 1 wherein at least one of said interstices does not have an optical fiber bonded therein, said interstice that does not have an optical fiber bonded therein being adapted to align said apparatus to a further device to which said apparatus is coupled.

16. The invention as defined in claim 1 wherein at least one of said interstices is formed between said at least two pins and a wall of said chuck.

17. The invention as defined in claim 1 wherein said non-rigid material is at least one of the group consisting of plastic, polyester, polyimide.

18. The invention as defined in claim 1 wherein at least one of said interstices contains an alignment member protruding therefrom.

19. The invention as defined in claim 1 further comprising a reinforcing sleeve coupled to said chuck.

20. The invention as defined in claim 1 further comprising a reinforcing sleeve integrated with said chuck.

21. The invention as defined in claim 1 further comprising glue which acts to couple said pins to each other.

22. The invention as defined in claim 1 wherein a face of said apparatus at which said ends of said fibers protrudes is polished.

23. The invention as defined in claim 1 wherein said fibers are cleaved fibers.

24. The invention as defined in claim 1 wherein said chuck has mounting holes within it which are adapted for mounting said apparatus to a further device to which said apparatus is coupled.

25. The invention as defined in claim 1 wherein at least one of said pins has at least one hole therethrough.

26. The invention as defined in claim 1 wherein at least one of said pins has at least one hole therethrough into which is inserted and bonded a fiber end.

27. The invention as defined in claim 1 wherein at least one of said pins has at least one hole therethrough into which is inserted and bonded an alignment member.

28. A method for making a precision fiber array, the method comprising the steps of:
   securing a plurality of pins in a chuck so as to form an array of interstices, each of said interstices being a space between at least two of said pins; said chuck including at least one flexible portion acting as a spring to exert a restorative force against said pins thereby holding them securely together with a desired precise spacing and alignment;
   inserting optical fiber ends into ones of said interstices; and
   bonding each of said optical fiber ends to its respective one of said interstices;
   wherein said chuck has an interior space in which said pins are secured, said securing step further comprising the steps of:
      heating said chuck to expand its interior space; and
      inserting at least one of said plurality of pins within said interior space while it is at least somewhat expanded as a result of said heating step.

29. The invention as defined in claim 28 further comprising the step of bonding each of said pins to each other.

30. The invention as defined in claim 28 further comprising the steps of:

bonding each of said pins to each other; and removing said chuck.

31. The invention as defined in claim 28 further comprising the step of polishing said optical fiber ends.

32. The invention as defined in claim 28 further comprising the step of aligning said optical fiber ends with an optical flat prior to performing said bonding step.

33. The invention as defined in claim 28 further comprising the step of coupling a reinforcing ring to said chuck.

34. The invention as defined in claim 28 further comprising the step of bonding an alignment member into at least one of said interstices so that a portion of said alignment member protrudes therefrom.

35. The invention as defined in claim 28 wherein at least one of said interstices does not have any of said fiber ends inserted therein.

36. The invention as defined in claim 28 wherein at least one of said interstices does not have one of said fiber ends inserted therein and instead is adapted to receive an alignment member from a further apparatus.

* * * * *